United States Patent Office

3,437,560
Patented Apr. 8, 1969

3,437,560
USE OF THE ENZYME HEXOKINASE FOR THE REDUCTION OF INHERENT LIGHT LEVELS
Robert C. Seamans, Jr., Deputy Administrator of the National Aeronautics and Space Administration, with respect to an invention of Emmett W. Chappelle, Baltimore, Md.
No Drawing. Filed July 27, 1966, Ser. No. 568,346
Int. Cl. C12d 13/10
U.S. Cl. 195—68
8 Claims

ABSTRACT OF THE DISCLOSURE

Residual ATP in partially purified luciferase is bound up by adding hexokinase and glucose. Hexokinase is a trans-phosphorylase which catalyzes the transfer of the terminal phosphate of ATP to glucose to give glucose-6-phosphate and ADP. While inherent (residual) ATP of luciferase is bound the additives do not interfere with ATP present in living organisms to be measured during life presence studies.

---

The invention described herein was made in the performance of work under a NASA contract and is subject to the provisions of Section 305 of the National Aeronautics and Space Act of 1958, Public Law 85–568 (72 Stat. 435: 432 U.S.C. 457).

This invention relates to light stabilization of luciferase compositions and more particularly to minimizing inherent light activity of residual adenosinetriphosphate (ATP) in such compositions. Specifically, this invention is directed to the use of the enzyme hexokinase in combination with glucose to produce a luciferase composition of minimal residual light which may be light activated by external ATP presence.

The problem of life detection in supposedly sterile environments or during outer space exploration has produced a number of unique proposed solutions. Of these one that has found considerable acceptance is the use of the bioluminescent oxidation reaction occurring naturally in fireflies. The reactants are the enzyme luciferase and two substrates, luciferin and ATP; the luciferase acting as a catalyst for the oxidation of luciferin; the ATP reacting with luciferin to put the latter in an oxidizable state. Since all terrestrial life insofar as presently known is intimately associated with, and dependent upon ATP, the determination of life is affected by bringing a luciferase-luciferin mixture in contact with a suspect area and, in the absence of external light, measuring by light detection equipment any bioluminescent reaction. If light is produced, it may be concluded that living organisms are present in the tested area.

The above is a quite simple explanation of a complex undertaking which involves many problem areas. One of these is the purification of luciferase whereby a composition is obtained with minimal inherent light producing characteristics. Since the luciferase is obtained from dessicated firefly tails which contain both luciferase and luciferin as well as ATP, without such purification it would be impossible to distinguish external ATP sources from ATP present in the basic luciferase composition. The luciferin is easily removed during extraction techniques but the ATP is very difficult to separate particularly since it must be completely eliminated in order that no inherent light producing composition be present when life detection is undertaken. The residual luciferin does not present such a problem since pure luciferin is added back into the luciferase composition when the purification is completed. Column chromotography utilizing molecular sieves has proven a satisfactory technique for removal of substantially all of the ATP in luciferase compositions derived from fireflies. However, even under highly controlled chromotographic operations inherent light is still present in the luciferase compositions due to the presence of endogenous ATP.

Other techniques either alone or in combination with column chromotography have been attempted to alleviate the residiual ATP problem. Crystallization and centrifugation, absorption or chemical reactant additions for binding up ATP followed by physical separation have been attempted. However none of these techniques has proven completely satisfactory for ATP removal. The problem with these procedures were either the physical separations were incomplete or the chemical reactants become residuals which would be present to bind ATP during actual life detection studies. Also, many chemicals which might be satisfactory for binding ATP could not be utilized due to deleterious effects upon luciferase or other system inclusions.

Therefore it is an object of the present invention to provide a technique for alleviating the problem of residual ATP in luciferase compositions whereby a stable composition is obtained suitable for use in life detection studies.

It is a further object of the present invention to develop such a technique which does not require crystallization, absorption, centrifugation steps for removal of ATP.

It is still a further object of the present invention to provide a method for treating luciferase compositions wherein any residual chemicals do not interfere with ATP present in living organisms to be measured during life presence studies.

Another object of the instant invention is the provision of a technique for solving the residual ATP problem in luciferase through utilization of materials of such a character as to be nonreactive with luciferase or any component of the luciferase-luciferin system except ATP.

These and other objects will become apparent from a study of the following complete invention description and claims.

The method of the instant invention, in brief, comprises the addition of the enzyme hexokinase along with glucose to the partially purified luciferase to bind up residual ATP. The hexokinase is a trans-phosphorylase which catalyzes the transfer of the terminal phosphate of ATP to glucose to give glucose-6-phosphate and adenosine diphosphate (ADP). It has been discovered that this particular enzyme while binding residual ATP will not effect external ATP sources encountered during life detection studies. This may be explained by the unique reaction rates of this particular enzyme which, although fairly rapidly catalyzing the residual ATP reaction does not react so quickly as to limit the reactions of the ATP encountered in life detection studies with the luciferin whereby the latter is put in an oxidizable state. Further this enzyme has the property of not producing products which might suppress the effectiveness of the luciferase-luciferin mixture and which itself has no effect on the luciferase composition components or combinations.

The particular luciferase compositions treated by the enzyme method of the instant invention are not critical and may comprise any luciferase-luciferin mixture as described for example in the publication "The Design and Fabrication of an Instrument for the Detection of Adenosinetriphosphate (ATP)," NASA CR–411, March 1966.

Hexokinase is a well known enzyme preparation and is readily available from a number of commercial sources. For purposes of the instant invention it must be in a relatively pure state particularly as to the presence of other enzymes. Since some commercial preparations are contaminated with rather high levels of such other enzymes, analysis must be undertaken on all proposed samples for use to insure minimal deleterious enzyme presence. Of principal concern is the enzyme apyrase which reacts quite quickly in binding ATP and which, if not removed, would tie the ATP during life detection before it could react with luciferin. Other enzymes that present contamination problems include myokinase, 3-phosphoglycerokinase and pyruvate kinase.

The addition of hexokinase along with glucose to the luciferin composition may be made during any stage of its preparation after initial luciferase purification by column chromatography. It is generally preferred to add it as a last step to insure action against all ATP present no matter what its source.

The amount of hexokinase added can not be defined in specific concentrations for all luciferase compositions for it is dependent upon both the specific activity of the particular batch of hexokinase utilized and the effectiveness of the luciferase purification steps. Where molecular sieve gel such as Sephadex G-200 (Pharmacia Fine Chemicals) is used for the purification as disclosed in NASA CR-411, maximum inherent light removal with minimal reduction in ATP response is effected with typical hexokinase concentration of about .01 mg. per ml. of luciferase. Amounts as low as .001 mg./ml. have some degree of effectiveness while excesses up to .1 mg./ml. do not substantially effect external ATP response. Of course these values will vary as pointed out above but the ranges of hexokinase noted will be effective for most residual ATP presence no matter what initial purification techniques are applied.

In view of the unique time delay characteristics of the hexokinase catalysis of the residual ATP with glucose it is essential that a time period elapse between hexokinase addition and life detection study. It has been discovered that a time lapse of at least 10 minutes from hexokinase addition is desirable although substantial inherent light reduction is effected after 5 minutes. Once this initial period has lapsed there is no problem with extended storage or subsequent processing such as lyophilization since the reaction transferring the terminal phosphate of ATP to glucose to give glucose-6-phosphate is substantially complete as long as an excess of glucose is present in the reaction mixture. To insure this latter desideratum, it has been found that utilization of equal volumes of glucose (.2 M) and luciferase from the Sephadex G-200 column will give sufficient glucose excess to insure such complete reaction.

Besides subsequent physical processing of the hexokinase treated luciferase mixture, it is possible also to add additional chemical components such as magnesium sulfate to catalyze the luciferin-ATP reaction, buffers such as glycyl glycine, sodium arsenate or trishydroxymethyl amino methane to insure optimum pH of about 7.5 and various complexing agents such as sodium ethylene diamine tetraacetates to prevent metal ion contamination.

Having described the general details of the invention, the following are specific examples thereof.

A reaction mixture was prepared as follows:

| | Ml. |
|---|---|
| Luciferase from Sephadex G-200 column (see NASA– CR–411 pgs. 24–26) | .1 |
| Glucose (0.2M) | .1 |
| Hexokinase (0.01 mg.)[1] | .1 |
| Luciferin (0.2 mg./ml.) | .1 |
| Magnesium sulfate (.01 M) | .1 |

[1] Sigma Chemical Corp., St. Louis, Mo.

A control mixture was prepared using distilled water in place of the hexokinase and glucose.

The following residual light levels were observed after 15 minutes incubation when .5 ml. each of the two mixtures were tested in a light measurement system as described in NASA–CR–411 at pp. 158–203. After testing 10 ATP ($1 \times 10^2 - 2\gamma$) was added to each composition to determine external life response:

| | Inherent light (c./5 sec.) | ATP response (c./5 sec.) |
|---|---|---|
| Control | 3,415 | 126,302 |
| Hexokinase | 28 | 110,000 |

It was observed that the inherent light levels were reduced over 99% while the after effect of the hexokinase-glucose combination only suppressed ATP activity by about 10%.

A second test was conducted with .1 ml. of the same composition as in the previous example except that the reaction mixtures were allowed to stand at room temperatures in the reaction chamber of the light measurement system with the inherent light measured at periodic intervals. The following effects of hexokinase-glucose additions were noted during a 20 minute incubation period:

| | Inherent light, c./10 sec. | | | | |
|---|---|---|---|---|---|
| | 0 | 5 min. | 10 min. | 15 min. | 20 min. |
| Control | 750 | 700 | 720 | 490 | 450 |
| Hexokinase | 750 | 70 | 35 | 20 | 20 |

This test substantiates the desirability of at least 10 minute incubation periods. It is further apparent that the relative diminution of inherent light level would be dependent upon the size of the sample tested, the example showing that a minimal inherent light level is obtained which appears to be independent of the volume tested due probably to the reversibility of the hexokinase reaction.

The instant invention provides a technique for residual ATP removal which produces a composition quite suitable for all types of life detection studies. The procedure is not complicated by strict temperature and pressure controls as might be required by other techniques for ATP removal. Of course of principal importance is that the treatment requires no subsequent processing for enzyme removal which might effect the luciferase component or render the process prohibitively expensive.

As many widely different embodiments of this invention may be made without departing from the spirit and scope thereof, it is understood that the invention is not limited to the specific embodiments thereof except as defined by the appended claims.

What is claimed is:

1. A method of reducing inherent light levels in luciferase compositions comprising adding to said composition hexokinase and glucose whereby any residual adenosinetriphosphate is transformed to adenosinediphosphate.

2. The method of claim 1 wherein the hexokinase additive is not contaminated with any apyrase.

3. The method according to claim 1 wherein the luciferase composition contains luciferin, magnesium ions, buffers and complexing agents.

4. The method of claim 1 wherein the hexokinase is added in amounts of at least .001 mg. up to .1 mg. per ml. of luciferase and the amount of glucose exceeds that amount necessary to react with the residual adenosinetriphosphate.

5. The method of claim 3 wherein the glucose is added as about a .2 M solution in amounts at least equal to the volume of luciferase present.

6. The method of claim 3 wherein the hexokinase is added on the basis of 0.1 mg. per ml. of luciferase.

7. The method of claim 3 wherein the buffer is a member selected from the group consisting of glycyl glycine, sodium arsenate, and trishydroxymethyl amino methane and the complexing agent is a sodium salt of ethylenediamine tetraacetate.

8. A method according to claim 7 wherein the pH is about 7.5.

References Cited

Methods in Enzymology vol. 2 pp. 851–861 (1955).

LIONEL M. SHAPIRO, *Primary Examiner.*

195—103.5, 67